United States Patent
Aktas et al.

(10) Patent No.: US 6,791,975 B1
(45) Date of Patent: Sep. 14, 2004

(54) CALL SIGNATURE IN A PACKET-BASED NETWORK

(75) Inventors: Christoph A. Aktas, Sunnyvale, CA (US); Bernard M. Guillot, Redwood City, CA (US); Paul G. Mayer, Mountain View, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/342,327

(22) Filed: Jun. 29, 1999

(51) Int. Cl.[7] ............................................. H04L 12/66
(52) U.S. Cl. ...................... 370/356; 370/352; 370/400; 370/401
(58) Field of Search ................................. 370/351, 356, 370/352, 462, 252, 229, 230, 231, 235, 401, 412, 428, 429, 389

(56) References Cited

U.S. PATENT DOCUMENTS

| | | | |
|---|---|---|---|
| 4,677,466 A | * 6/1987 | Lert et al. ...................... 725/22 |
| 5,625,675 A | 4/1997 | Katsumaru et al. ........... 379/67 |
| 5,633,916 A | 5/1997 | Goldhagen et al. ........... 379/67 |
| 5,742,596 A | * 4/1998 | Baratz et al. ................ 370/356 |
| 5,761,201 A | 6/1998 | Vaudreuil |
| 5,812,795 A | 9/1998 | Horovitz et al. ........ 395/200.75 |
| 5,841,966 A | 11/1998 | Irribarren ............... 395/200.36 |
| 6,205,135 B1 | * 3/2001 | Chinni et al. ................ 370/356 |

FOREIGN PATENT DOCUMENTS

| | | |
|---|---|---|
| EP | 0 915 596 A2 | 5/1999 |
| EP | 0 924 918 A2 | 6/1999 |
| WO | WO 98/47298 | 10/1998 |

\* cited by examiner

*Primary Examiner*—Wellington Chin
*Assistant Examiner*—Raj Jain

(57) ABSTRACT

A method and system for supporting a real-time communication on an integrated packet-based network involve accumulating information about the communication, referred to as signature data, while the communication is being setup and/or is in progress and storing the signature data in a database that is openly accessible to any applications that are connected to the network. Once signature data regarding an active real-time communication is accumulated, portions of the signature data may be utilized to further process the active real-time communication. Providing an openly accessible communication profile that is accumulated while the communication is in progress allows applications to provide a higher level of service by tailoring actions to the profile of the specific communication.

18 Claims, 5 Drawing Sheets

CALL SIGNATURE IN A PACKET-BASED NETWORK

BACKGROUND OF THE INVENTION

The present invention relates to an integrated information and communication network, and more particularly the invention relates to real-time communications that are conducted over a packet-switched network.

DESCRIPTION OF THE RELATED ART

Large business enterprises often maintain a communication network, such as a PBX-based telephone network, and an information network, such as a LAN. The communication network is typically a circuit-switched network that includes multiple telephones that are individually connected to a proprietary PBX system. The communication network enables real-time communications (e.g., voice conversations) between two or more parties. The information network is typically a packet-switched network that is connected to desktop terminals, file servers, and other data network devices.

In order to eliminate the need to maintain two separate networks, integrated networks have been developed that can support real-time communications between two or more parties, as well as non-time-critical data transmissions. The integrated networks are packet-switched networks which typically utilize the Transmission Control Protocol/Internet Protocol (TCP/IP) suite of network protocols to transfer packets. Some of the integrated networks still utilize proprietary PBX systems to provide traditional PBX features such as operator services, call waiting, call forward, call conference, call transfer, and camping. Other integrated networks provide traditional PBX features completely within a packet-based environment.

An example of an integrated network that utilizes packet switching to enable real-time communications and non-time-critical data transfers is disclosed in U.S. Pat. No. 5,742,596, issued to Baratz et al. (hereinafter Baratz). The Baratz system enables packets to be exchanged between two devices to accomplish real-time voice communications in conjunction with non-time-critical data transfers. The Baratz system incorporates many PBX features, including call transferring and call forwarding, and telephone system applications, such as voicemail, interactive voice response (IVR), automatic call distribution (ACD), and automatic message distribution (AMD), into an entirely packet-based system.

In the course of a single call conducted over an integrated network (e.g., the Baratz system), there may be interaction with more than one application that supports real-time communications. For example, a call may initially interact with an ACD application, then be transferred to an IVR application, and then be transferred to a voicemail application. In conventional integrated networks such as Baratz, an active call interacts with each application in isolation from the other applications. That is, the voicemail application does not share information with the IVR application or the ACD application and vice versa. In addition, call-specific information gathered by one application is not readily accessible by another application, either while the call is active or after the call is completed. Lack of communication between applications that support real-time communications can reduce the quality of service provided to a calling party when, for example, the called party is asked for redundant information or put through redundant steps. Enabling communication between different applications can be difficult because applications are often incompatible.

In view of the problems involved with applications that do not, or cannot, communicate with each other, what is needed is an integrated information and communication network that enables different applications to share information, especially while a real-time communication is active on the integrated network.

SUMMARY OF THE INVENTION

A method and a system for supporting a real-time communication on an integrated packet-based network involve accumulating information about the communication, referred to as signature data, while the communication is in progress and storing the signature data in a database that is openly accessible to any applications that are connected to the network.

Once signature data regarding an active real-time communication is accumulated, portions of the signature data may be utilized to further process the active real-time communication. In addition, the signature data may be updated during the communication setup, at any time during the course of the real-time communication, or after the real-time communication is complete. Providing an openly accessible communication profile that is accumulated and accessible while the communication is in progress allows applications to provide a higher level of service by tailoring actions to the profile of the specific communication.

In an embodiment, real-time communications conducted on an integrated network are supported by a signature service that is connected to the integrated network. The integrated network may include a gateway, a gatekeeper, application servers, terminals, and the signature service. The integrated network may also be connected to a circuit-based PSTN through a gateway. The signature service may reside on a single server that is connected to the integrated network. The signature service can alternatively be distributed throughout the network, with portions of the signature service being supported by various devices or systems. For example, the signature service can be integrated with any of the gateway, gatekeeper, application servers, and/or terminals.

The signature service is preferably a database that stores information in, for example, a relational or object format. The database has an open format that allows data to be accessed by any application. The signature service is preferably a passive element that can be continually updated throughout the active life of a call. Throughout the specification, the term "call" is used to represent a real-time communication between two parties, with the two parties interfacing with the integrated network through devices such as telephones or the terminals. A call may also represent a real-time communication between one party and a network application. For example, one party interacting with a voicemail system is a real-time communication between one party and an application. Real-time communications may also involve multiple parties, for example, a conference call between more than two parties. Real-time communications may also involve multimedia communications, such as video conferencing and white-boarding.

The function of the signature service in relation to a party-to-party communication that is conducted in real-time is described herein. The party-to-party communication may be, for example, two parties engaged in a conventional voice conversation that is at least partially supported by the packet-based network. In the first step a call setup routine is initiated to establish a connection between the calling party and the called party. Once the call setup is complete and the call is connected, packets containing voice information are exchanged between the calling party and the called party. The exchange of packets continues until the call between the calling party and called party is ended.

During the time when the call between the two parties is active, or "in parallel" with the active call, signature data may be generated. The signature data may be generated by the gateway, the gatekeeper, the application server, the terminals, and/or some other devices or systems. The content of the signature data is primarily non-voice data that may include, for example, the identification of the calling party, the call origin, the call type, the reason for transferring the call, the application type, the time/date of the call, and/or the duration of the call. Signature data may also be generated during call setup. Regardless of where the signature data is generated or the content of the signature data, if signature data is generated, signature data is used to update the signature service. As stated above, the signature service is an openly accessible database that stores received signature data in a relational or object manner. If signature data is not generated during the call between the two parties, the signature service is not updated and the call eventually ends. Once the call has ended, new signature data may be generated. For example, the ending time of the call or the bandwidth consumed by the call may be provided to the signature service as signature data. The signature data related to the call is maintained by the signature service and is available beyond the active life of the call.

The function of the signature service is also described in relation to a party-to-application communication that is conducted in real-time. A party-to-application communication is a communication in which a party interacts with one of the real-time communications applications that are available on the integrated network. An example of a party-to-application communication is a calling party interacting with an IVR application or an ACD application. The party-to-application communication may occur at any point during the active life of a real-time communication, for example, the party-to-application communication may occur before or after a party-to-party communication as described above.

In a first step, a call setup routine is initiated to establish a connection between a calling party and the application. Once the call setup is complete and the call is connected, packets containing information, such as voice or keypad entries, are transmitted to the application from the called party. Packets containing information such as computer-generated voice data may be transmitted to the calling party from the application in order to conduct the real-time communication. The exchange of packets continues until the call between the calling party and the application ends.

During the time when the call is active, or in parallel with the active call, multiple interactions with the signature service are possible. Before interaction with the application begins, it is possible that some signature data may be generated. If signature data is generated, the signature data is used to update the signature service. Once interaction with the application begins, the application may benefit from accessing a portion of the signature data that is maintained by the signature service. If the application requests some piece of signature data, the signature data is fetched from the signature service. Also during interaction with the application, some signature data may be generated. If signature data is generated, the generated signature data can be used to update the signature service. It should be noted that while the application is exchanging signature data with the signature service, the real-time communication between the calling party and the application continues in parallel. That is, packets of data involved with transmitting the real-time communication are separate and distinct from packets of data involved with transmitting the signature data to and from the signature service.

Once the interaction with the application is complete, there is another opportunity to generate signature data. Whether or not signature data is generated, when the exchange of real-time communication packets between the calling party and the application is completed, the call is ended. However, after the call has ended, signature data may again be generated.

In another method of the signature service, a single call may interact with many applications or parties during the active life of the call. In this case, during each interaction there is an opportunity to exchange signature data with the signature service. For example, an application may fetch particular signature data from the signature service in order to tailor the function of the application. Alternatively or additionally, an application may generate new signature data that is to be deposited within the signature service.

An advantage of the signature service is that during the life of the call, signature data stored within the signature service creates a call history, or call profile, concerning the call. Having a call history available to the various applications that may interact with a call enables the applications to provide a higher level of service to the called party by making decisions that are at least partially based on the history of the call. In addition, because the signature service operates utilizing a network protocol suite such as TCP/IP, the signature service can be easily integrated into the network.

DETAILED DESCRIPTION

Figure 1:
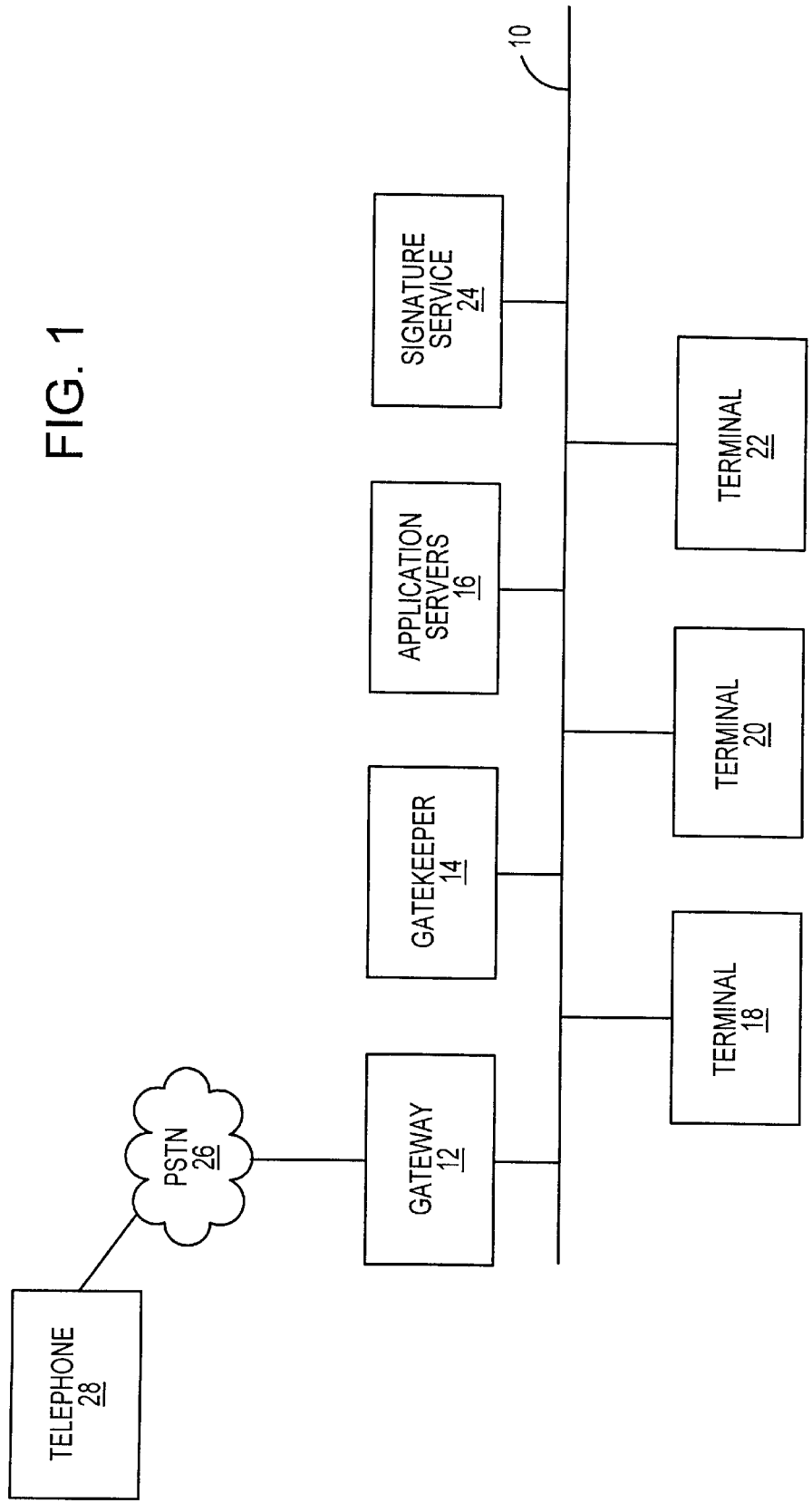
FIG. 1 is a depiction of an integrated information and communications network that includes a signature service in accordance with the invention.

FIG. 1 is a depiction of an integrated information and communication network 10 in which a real-time communication signature service (signature service) is implemented. In an embodiment, the integrated network utilizes the Internet Protocol (IP) and the International Telecommunications Union's (ITU) H.323 standard for transmission of real-time audio, video, and data communications over a packet-based network. The H.323 protocol specifies components, protocols, and procedures that are necessary to accomplish real-time communications over a packet-based network. The integrated network depicted in FIG. 1 is a packet-based network that includes a gateway 12, a gatekeeper 14, application servers 16, multimedia terminals 18, 20, and 22, and the signature service 24. The integrated network is connected to a circuit-switched PSTN 26 through the gateway. Multiple telephones (represented as a single telephone 28) are indirectly connected to the packet-based network through the PSTN and the gateway.

The gateway 12 connects the circuit-switched PSTN 26 to the packet-switched integrated network 10 so that real-time communications can be conducted between the terminals 18–22 and the telephone 28. To provide connectivity between the networks, the gateway translates protocols for call setup and release, and converts media formats between the different networks. The gatekeeper 14 provides real-time services such as call addressing, authorization, authentication of terminals and gateways, and bandwidth management. The gatekeeper may also provide call routing services. The terminals provide the interface between the integrated network and the parties that use the network. The terminals are typically telephones that are directly connected to the packet-based network. The terminals may also include desktop PCs and/or dumb terminals, although the terminals may include other devices or systems such as video conferencing systems.

The application servers 16 represent applications that may be available on the integrated network. Some application servers may support non real-time applications such as accounting applications, human resources applications, customer applications, etc. Other application servers may support real-time applications such as interactive voice response (IVR), automatic call distribution (ACD), voicemail, call conferencing, and video conferencing. The real-time applications are referred to as "real-time" because the transmission of time-critical packets must occur nearly instantaneously in order to provide effective real-time communication. Interaction between the signature service 24 and the real-time applications is a focus of the invention that is described in further detail below.

Although particular non-time-critical and time-critical applications are described, other non-time-critical and time-critical applications are likely to be available on the network. In addition, although the applications are described as resident on servers, this is not required. The applications may be, for example, distributed onto other network systems such as desktop PCs or centralized onto a single system. The applications may also be incompatible with each other. For example, the applications may be developed by different vendors and/or the applications may be developed on incompatible platforms.

The signature service 24 is represented in FIG. 1 as a single device. The signature service is generally a database that stores information related to calls and that makes the stored information available for any network device to use. In one embodiment, the signature service resides on a single server that is connected to the integrated network 10, however this is not a requirement. The signature service can alternatively be distributed throughout the network, with portions of the signature service being supported by various devices or systems. For example, the signature service can be integrated with any of the gateway 12, gatekeeper 14, or application servers 16. A detailed description of the function of the signature service for real-time communication is provided below in conjunction with FIGS. 3 through 5.

Throughout the specification, the term "call" is used to represent a real-time communication between two parties, with the two parties interfacing with the integrated network 10 through devices such as the terminals 18–22 or the telephone 28. A call may also represent a real-time communication between one party and a network application. For example, one party interacting with a voicemail system is a real-time communication between one party and an application. Real-time communications may also involve multiple parties, multiple applications, or a mix of parties and applications. For example, a call may involve a conference call between more than two parties or an interaction with an IVR application, an ACD application, and a customer service representative. Real-time communications may also involve multiple media (multimedia). Examples of multimedia calls include video conferencing (includes audio and video components) and white-boarding (includes audio and graphics components).

Figure 2:
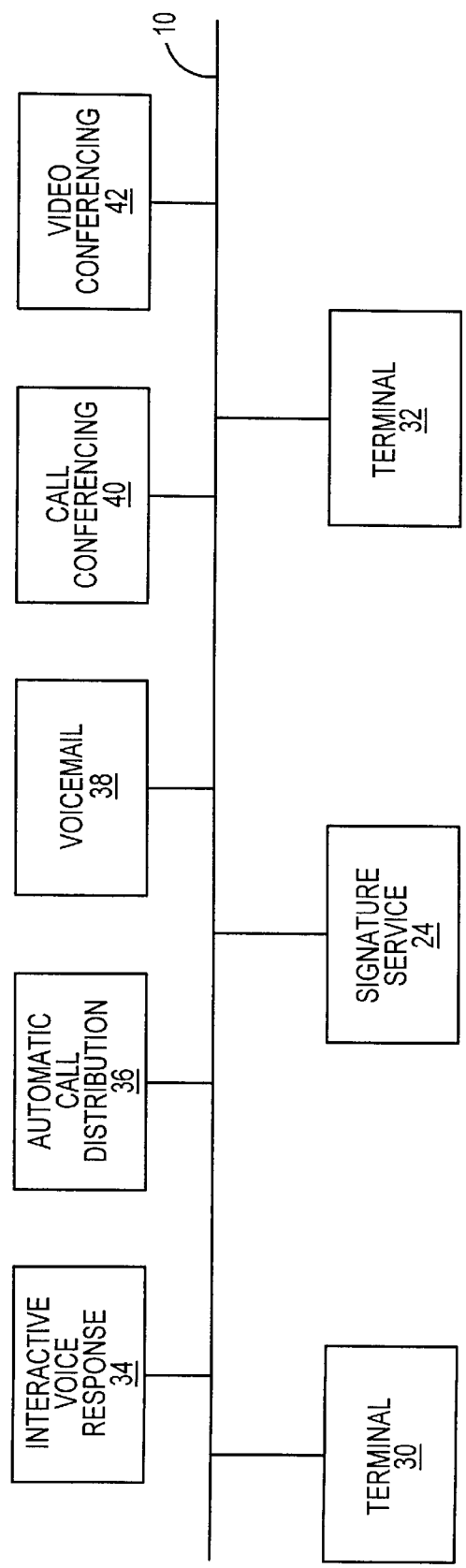
FIG. 2 is a depiction of an integrated network that includes real-time applications, terminals, and a signature service in accordance with the invention.

FIG. 2 is a depiction of specific real-time applications that are available on an example integrated network 10. The real-time applications are shown in relation to two terminals 30 and 32 and the signature service 24. For purposes of description, the real-time applications and the signature service are depicted as separate devices, such as servers, that are individually connected to the integrated network, although this is not required. The depicted real-time applications include conventional IVR 34, ACD 36, voicemail 38, call conferencing 40, and video conferencing 42 applications that are compatible with a packet-based network. Other real-time applications may also be included in the network and none of the depicted applications are critical to the invention.

An example call may involve a party at the leftmost terminal 30 talking to a party at the rightmost terminal 32 via the packet-based integrated network. Another example of a call may involve a party at the leftmost terminal interacting with the ACD application 36, and then the IVR application 34, and then the voicemail application 38, all during the same call.

Figure 3:
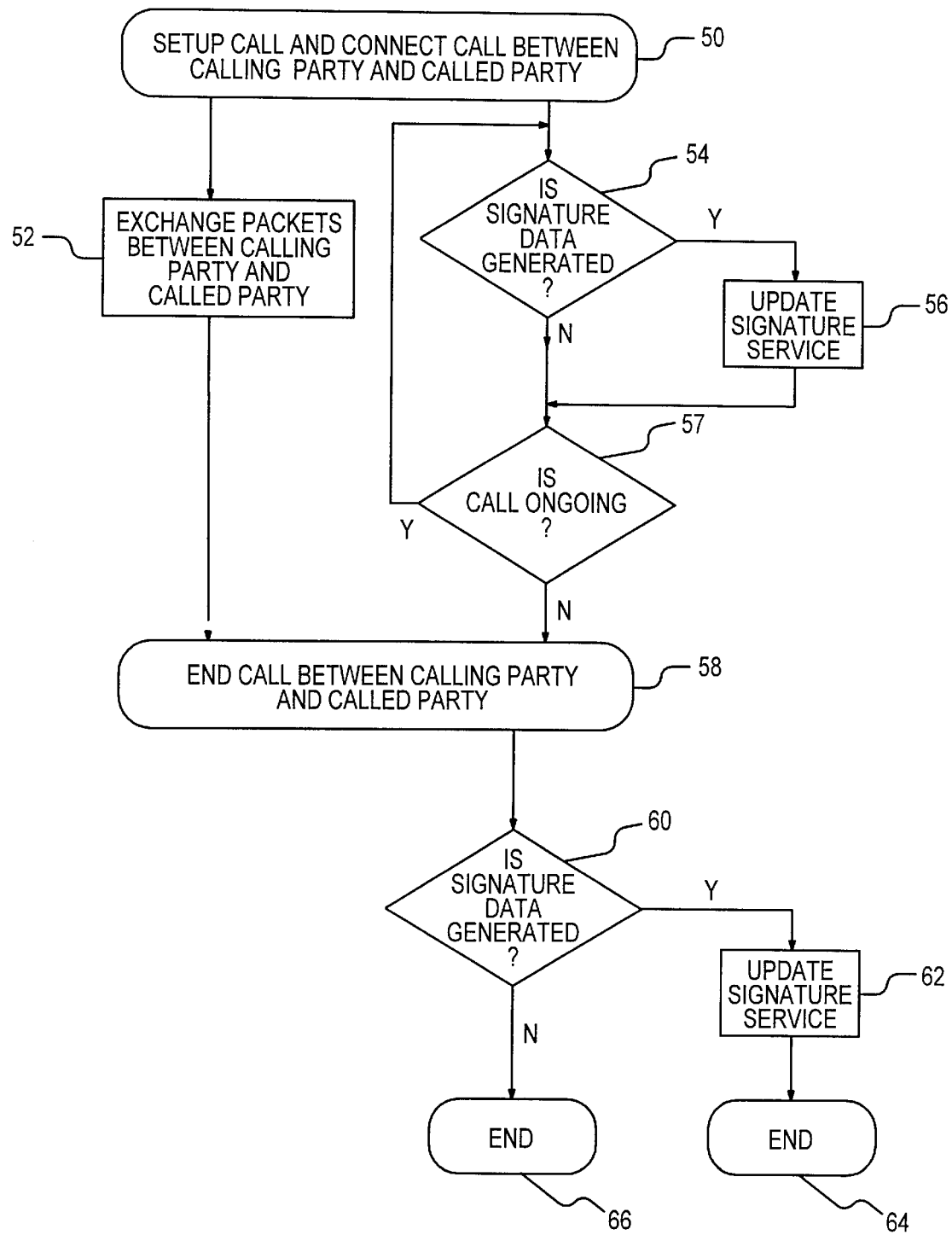
FIG. 3 is a process flow diagram that represents the function of the signature service in relation to a party-to-party communication in accordance with the invention.

FIG. 3 is a process flow diagram that represents the function of the signature service in relation to a party-to-party communication that is conducted in real-time. The party-to-party communication may be, for example, two parties carrying on a conventional voice conversation at least partially via the packet-based network. In the example party-to-party interaction, there is no interaction with real-time applications such as those shown in FIG. 2, although this is not critical. In the first step 50, a call setup routine is initiated to establish a connection between the calling party and the called party. Call setup and call connection typically involve interaction between the terminals and the gatekeeper, and involve interaction with the gateway if one of the parties is connected to the integrated network through the PSTN. Once the call is setup and connected, packets containing voice information (or other multimedia information) are exchanged between the calling party and the called party. The exchange of packets is represented on the left side of the process flow diagram at step 52. The exchange of packets continues until the call between the calling party and the called party is ended, as indicated at step 58.

During the time when the call is active, or "in parallel" with the active call, as depicted on the right side of the flow diagram, signature data may be generated as indicated by decision point 54. Signature data may also be generated during the call setup and connection processes. The signature data may be generated by the gateway 12, the gatekeeper 14, the application servers 16, the terminals 18–22, 30 and 32, and/or some other device(s) or system(s). The timing and content of generated signature data can be customized to fit the needs of a particular integrated network. For example, a network administrator can define which aspects of a call should be captured. Defining the timing and content of signature data can be controlled through management software and can be changed at any time.

The content of the signature data is primarily non-voice data that may include, for example, the identification of the calling party, the reason for the call (e.g., direct, transfer, forward, callback, etc.), the call origin (internal or external), the call type (e.g., voice, fax, video), application type involved (white-boarding, spreadsheet, etc.), time/date of the call, duration of the call, bandwidth required for the call, bandwidth consumed by the call, services requested, and people already contacted during the call. Although specific examples of signature data content have been identified, other items of signature data may be generated.

Regardless of where the signature data is generated or the content of the signature data, if signature data is generated, the signature data is used to update the signature service, as shown at step 56. The signature service is preferably designed around a database that stores information in a relational or object manner. The signature service has an open interface that allows data to be accessed by any application. The signature service is a passive element that can be continually updated throughout the active life of the call between the calling party and the called party. For example, the steps 54 and 56 of generating signature data and updating the signature service can be repeated multiple times, as indicated by the loop that includes the decision step 57 of determining whether the call is ongoing. If signature data is not generated, the signature service is not updated and the call eventually ends, as shown at step 58. Although not shown, signature data can also be accessed from the signature service during the call setup, the call connection, and/or the party-to-party communication. For example, the called party may access the signature service to determine how long the calling party was on hold, or the setup routine may access the signature service to determine the call history of the calling party.

Once the call has ended, new signature data may be generated, as indicated by decision point 60. For example, the ending time of the call, the bandwidth consumed by the call, or the manner in which the call was ended (e.g., hung up or disconnected because of a transmission error) may be provided to the signature service as signature data. In the event that signature data is generated, the generated signature data is used to update the signature service, as shown at step 62, and then the interaction with the signature service is ended at step 64. If signature data is not generated, the signature service is not updated and interaction with the signature service is ended at step 66. The signature data related to the call is maintained by the signature service and may be made available beyond the active life of the call. For example, during a subsequent call, the signature service may be accessed to obtain a profile of calls previously made by the calling party.

Figure 4:
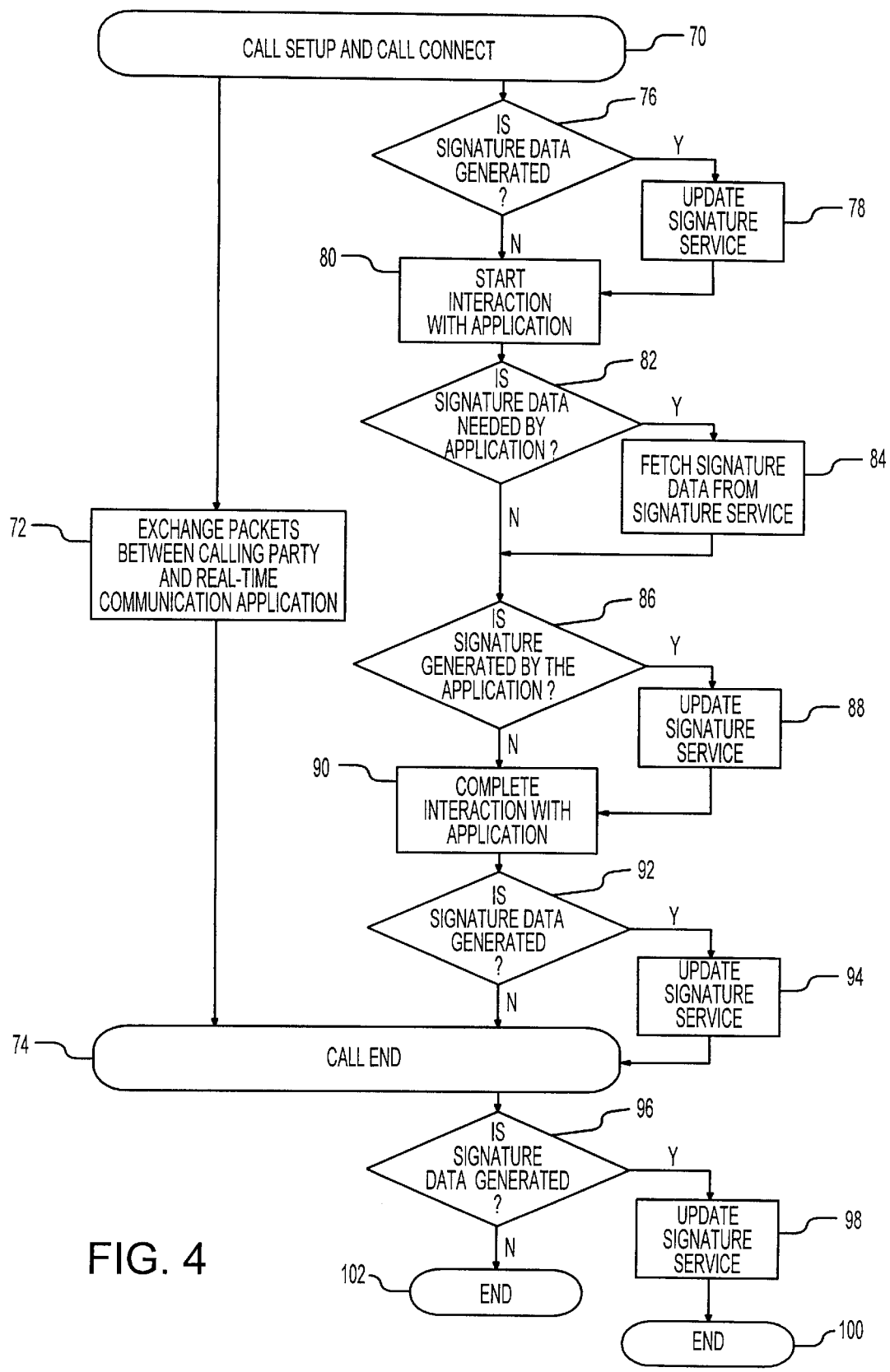
FIG. 4 is a process flow diagram that represents the function of the signature service in relation to a party-to-party communication.

FIG. 4 is a process flow diagram that represents the function of the signature service in relation to a party-to-application communication. A party-to-application communication is a communication in which a party interacts with one of the real-time communications applications that are available on the integrated network. An example of a party-to-application communication is a calling party interacting with an IVR application or an ACD application. Although not shown, the party-to-application communication may occur at any point during the active life of a real-time communication, for example, before or after a party-to-party communication as described with reference to FIG. 3.

In a first step 70, a call setup routine is initiated to establish a connection between the calling party and the application. Once the call setup is complete and the call is connected, as represented by the left side of the process flow diagram at step 72, packets containing information, such as voice or keypad entries, are transmitted to the application from the called party. Packets containing information such as computer-generated voice data may be transmitted to the calling party from the application. In an example packet exchange in which a party is interacting with a voicemail application, the voicemail application may transmit packets containing menu options, the caller may initiate transmission of packets containing a selected menu option, the application may transmit packets containing a greeting or directions, and the caller may transmit packets containing a voice message that is recorded by the voicemail application. The exchange of packets continues as indicated at step 72 until the call between the calling party and the application ends, as indicated at step 74.

During the time when the call is active, or in parallel with the active call, multiple interactions with the signature service are possible, as represented by the right side of the process flow diagram. At the first decision point 76, it is possible that some signature data may be generated. If signature data is generated, the generated signature data is used to update the signature service as shown at step 78. In an example, the signature service may be updated with signature data that represents the identity of the calling party and/or the time that the call started. The signature data may be supplied to the signature service even though it is not yet known whether or not the provided signature data will be of any use while the call is active or even after the call is ended. Signature data may also be generated and/or accessed during the call setup/call connection processes. Whether or not signature data is generated, in the next step 80, interaction with an application begins. The process flow diagram is generic to all real-time communication applications and therefore a specific application is not specified in FIG. 4.

Once interaction with the application begins, the application may want to utilize some piece of signature data that is maintained by the signature service, as indicated by decision point 82. If the application wants some piece of signature data, then the signature data is fetched from the signature service at step 84. Also during the interaction with the application, some signature data may be generated, as indicated by decision point 86. If signature data is generated, the generated signature data can be used to update the signature service as shown at step 88. Although the process flow diagram shows a signature data fetch followed by a signature data update, different combinations of fetches and updates, or only fetches or only updates are possible during an interaction with an application. It should be noted that while the application is exchanging signature data with the signature service, the real-time communication between the calling party and the application continues in parallel as shown on the left side of the process flow diagram. That is, packets involved with transmitting the real-time communication are separate and distinct from packets involved with transmitting the signature data to and from the signature service.

After the interaction with the application is completed, in step 90, there is another opportunity to generate signature data. If signature data is generated at decision point 92, the signature data can be used to update the signature service at step 94. Whether or not signature data is generated, when the exchange of real-time communication packets between the calling party and the application is completed, the call is ended, as indicated at step 74.

Once the call has ended, new signature data may again be generated at decision point 96. In the event that signature data is generated, the generated signature data is used to update the signature service at step 98 and then interaction with the signature service is ended at step 100. If signature data is not generated, the signature service is not updated and interaction with the signature service is ended at step 102.

Figure 5:
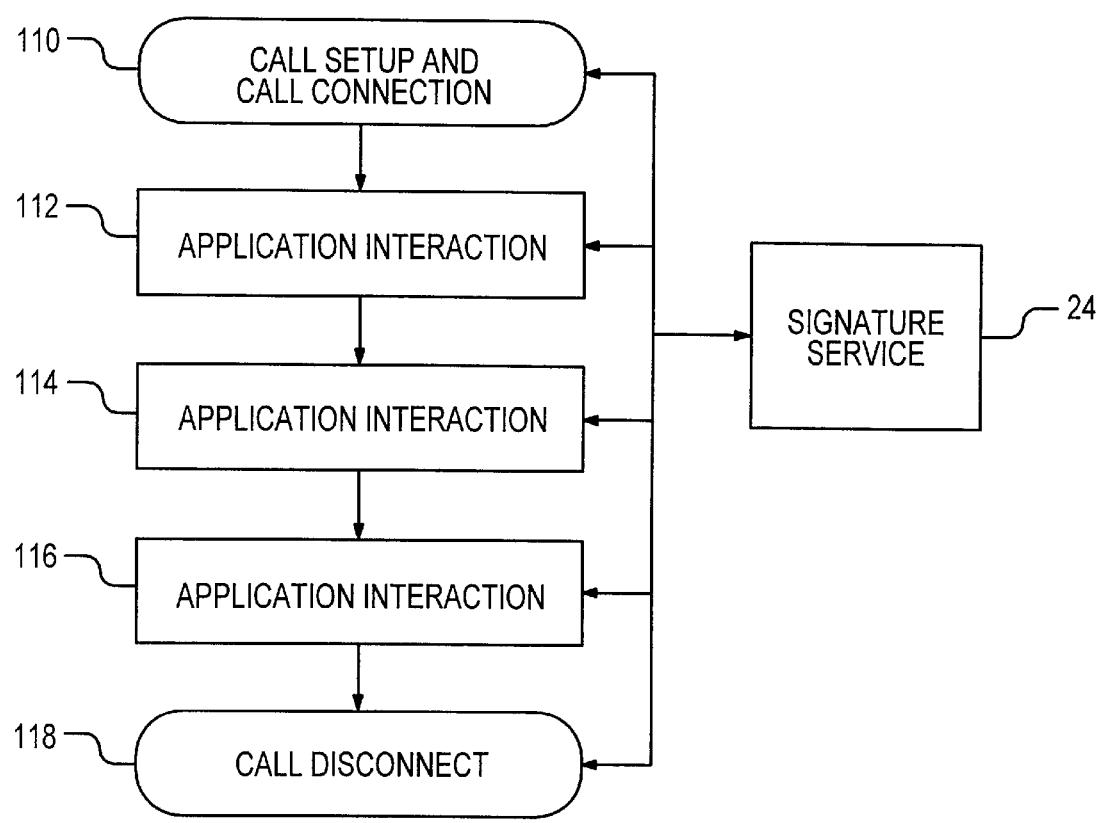
FIG. 5 is a process flow diagram that represents the signature service in relation to a call that has many application interactions during the life of the call in accordance with the invention.

FIG. 5 is a process flow diagram that represents the signature service in relation to a call that has many interactions during the active life of the call. Although the interactions are identified as "application" interactions, the interactions may also include party-to-party interactions. As with FIGS. 3 and 4, in an initial step 110, a call setup routine is initiated and a connection is made between a calling party and either a called party or an application. During the call setup/connection step, the signature service 24 is accessible for signature data fetching and/or updating.

Upon completion of the call setup/connection, the call may interact with a first application, step 112, such as an ACD application. During the interaction with the first application, the signature service is accessible for signature data fetching and/or updating. For example, signature data representing ACD selections made by the calling party may be stored in the signature service. After the interaction with the first application is complete, the active call may be forwarded to another application. For example, a caller may first interact with the ACD application and then be forwarded to an IVR application. During the interaction with the second application, step 114, the signature service is again accessible for signature data fetching and/or updating. For example, the IVR application may want to know which selections were made by the calling party during the ACD interaction. The information desired by the IVR application may be found in the signature service. In addition, the IVR application may provide signature data regarding selections that were made by the calling party during the IVR interaction.

After the call interaction with the second application is complete, the call may be forwarded to another application, such as voicemail. During the interaction with the third application, step 116, the signature service is again accessible for signature data fetching and/or updating. For example, the voicemail system may want to know what selections were made during the IVR interaction in order to tailor the voicemail greeting. In addition, the voicemail application may deposit some signature data with the signature service.

After the interaction with the third application is complete, the call is disconnected at step 118. During the call disconnect, the signature service is again accessible for signature data fetching and/or updating. As shown in FIG. 4, the signature service is a passive backend element that provides a repository for call information that may be helpful to some application, although operation of the signature service is not critical to the operation of the applications. The signature service stores information in an open format, so that the signature service is compatible with all of the applications. The call information maintained by the signature service may be utilized by, for example, a network administrator for analysis of network loading. The network administrator can then use the information in the signature service to optimize performance of the network by, for example, adjusting bandwidth allocations to accommodate present needs.

As shown in FIGS. 3 through 5, one preferred use of the signature data is to provide information that can be used by different applications during the active life of a call that is conducted via a packet-based network that utilizes IP. That is, a call history, or call profile, is generated while the call is in progress and because the history is not stored in fragmented pieces in non-compatible applications, any part of the call history can be openly utilized by any application that needs information from the call history while the call is in progress. In this preferred use, the call history is tied specifically to the present call.

In another preferred use, signature data may be related to a specific calling party, or class of calling parties. When a specific calling party is identified, the signature service can be accessed to identify a caller profile that is related to the specific calling party. For example, the caller profile may indicate the frequency of calls by the calling party, the applications that are most often used by the calling party, and/or the people within the enterprise that are most often contacted by the calling party.

What is claimed is:

1. A method for supporting a real-time communication comprising the steps of:

establishing a real-time communication that is at least partially supported by a packet-based network;

transmitting at least a portion of said real-time communication via said packet-based network;

generating signature data that is related to said real-time communication while said real-time communication is active, said signature data being separate and distinct from said real-time communication;

accumulating said signature data in a database while said real-time communication is active;

configuring functionalities in said support of said real-time communication by said packet-based network on a basis of said signature data, including providing access to said signature data accumulated within said database while said real-time communication is active, said signature data being accessible from said packet-based network and being accessible by a plurality of applications connected to said packet-based network, interacting with a first telephony application that is connected to said packet-based network while said real-time communication is active;

fetching a first portion of said signature data that is accumulated within said database and related to said real-time communication while said real-time communication is active;

utilizing said first portion of said signature data in determining processing during said interaction with said first telephony application while said real-time communication is active;

interacting with a second telephony application that is connected to said packet-based network while said real-time communication is active, but after said interaction with said first telephony application is completed;

fetching a second portion of said signature data that is accumulated within said database and related to said real-time communication while said real-time communication is active; and utilizing said second portion of said signature data in determining processing during said interaction with said second telephony application while said real-time communication is active.

2. The method of claim 1 further including the steps of:

fetching a portion of said signature data that is accumulated within said database and related to said real-time communication while said real-time communication is active; and utilizing said fetched portion of said signature data to support said real-time communication while said real-time communication is active.

3. The method of claim 2 wherein said signature data includes at least one of a calling party=s identification, time and date of said real-time communication, transfer information, media used for said real-time communication, and bandwidth requirements for said real-time communication.

4. The method of claim 2 wherein said real-time communication includes data packets containing time-critical voice information and wherein said signature data consists entirely of data packets containing non-time-critical information, wherein said generation of said signature data is primarily based on detecting non-voice related data exchanged in conducting said real-time communication, said real-time communication being a telephone call involving at least one party.

5. The method of claim 4 wherein said real-time communication is a multimedia communication.

6. The method of claim 1 wherein said step of establishing a real-time communication includes a step of generating initial signature data.

7. The method of claim 1 wherein said step of establishing a real-time communication includes a step of fetching stored signature data.

8. The method of claim 1 further including the steps of:
generating additional signature data related to said real-time communication after said first portion of said signature data is utilized in said interaction with said first telephony application and while said real-time communication is active; and
accumulating said additional signature data in said database while said real-time communication is active.

9. The method of claim 1 wherein said signature data is embedded in packets that are separate from packets carrying said real-time communication, and wherein said portion of said real-time communication is transmitted over said packet-based network utilizing Internet Protocol (IP).

10. A method for supporting a real-time communication comprising steps of:
conducting a real-time communication between first and second communications devices at least partially via a packet-based network that utilizes Internet protocol (IP) to transmit packets, at least one of said first and second communications devices being directly connected to said packet-based network;
generating signature data that is related to said real-time communication while said real-time communication is being conducted;
transmitting said real-time communication within real-time communication packets, said real-time communications packets containing time-critical information;
transmitting said signature data within signature data packets while said real-time communication is being conducted, said signature data packets being separate from said real-time communication packets;
storing said generated signature data in a signature service database;
accessing said signature data in said signature service database while said real-time communication is in progress; and
utilizing said signature data as a basis for conducting an interaction with a first real-time application directly involving said first and second communications devices while said real-time communication is in progress;
wherein said step of conducting a real-time communication includes a step of interacting with a plurality of real-time telephony applications and wherein said step of generating signature data includes generating signature data upon interaction with each one of said plurality of real-time telephony applications, so as to create a call profile of said real-time communication while said real-time communication is in progress.

11. The method of claim 10 wherein said real-time communication packets contain voice information related to said real-time communication, and wherein said signature data packets contain no voice information related to said real-time communication.

12. The method of claim 10 further including the steps of:
accessing said signature data in said signature service database a second time while said real-time communication is in progress; and
utilizing said signature data in an interaction with a second real-time application while said real-time communication is in progress.

13. The method of claim 10 wherein said signature data includes at least one of a calling party=s identification, time and date of said real-time communication, reason for said real-time communication, media used for said real-time communication, and bandwidth requirements for said real-time communication.

14. A system for supporting a real-time communication comprising:
means for establishing a real-time communication between a first device and a second device, said first and second devices being telephony devices;
means for transmitting at least a portion of said real-time communication between said first device and said second device via a packet-based network utilizing real-time communication packets that contain time-critical information;
means for generating signature data related to said real-time communication while said real-time communication is active, said signature data being transmitted in signature data packets that are separate and distinct from said real-time communication packets;
means for accumulating said signature data in a database that is accessible from said packet-based network while said real-time communication is active;
application support means for providing interaction between said first device and a telephony application that is connected to said packet-based network while said real-time communication is active;
means for fetching a portion of said signature data that is accumulated within said database and related to said real-time communication; and
processing means operatively associated with said application support means for utilizing said portion of said signature data in said interaction between said first device and said application, said processing means and said application support means being cooperative to vary said interaction on a basis of content of said portion.

15. The system of claim 14 wherein said real-time communication packets contain time-critical voice conversation information and wherein said signature data packets contain no time-critical voice conversation information.

16. The system of claim 14 further including:
means for generating additional signature data related to said real-time communication after said real-time communication is ended; and
means for accumulating said additional signature data in said database.

17. The system of claim 14 wherein said means for transmitting includes an integrated information and communications network that transmits packets utilizing Internet Protocol (IP).

18. The system of claim 14 wherein said first device is a telephone that is directly connected to a PSTN and wherein said second device is a server that is directly connected to an integrated information and communications, packet-switched network.

* * * * *